US012309899B2

(12) United States Patent
Borra et al.

(10) Patent No.: US 12,309,899 B2
(45) Date of Patent: May 20, 2025

(54) CONTROLLING AN ARRAY OF LIGHT SEGMENTS BASED ON USER INTERACTION WITH VIRTUAL REPRESENTATIONS IN COLOR SPACE

(71) Applicant: SIGNIFY HOLDING B.V., Eindhoven (NL)

(72) Inventors: Tobias Borra, Rijswijk (NL); Berent Willem Meerbeek, Veldhoven (NL)

(73) Assignee: SIGNIFY HOLDING, B.V., Eindhoven (NL)

( * ) Notice: Subject to any disclaimer, the term of this patent is extended or adjusted under 35 U.S.C. 154(b) by 99 days.

(21) Appl. No.: 18/023,068

(22) PCT Filed: Aug. 19, 2021

(86) PCT No.: PCT/EP2021/073072

§ 371 (c)(1),
(2) Date: Feb. 24, 2023

(87) PCT Pub. No.: WO2022/043191

PCT Pub. Date: Mar. 3, 2022

(65) Prior Publication Data

US 2024/0032179 A1 Jan. 25, 2024

(30) Foreign Application Priority Data

Aug. 26, 2020 (EP) .................................... 20192830

(51) Int. Cl.
*H05B 47/17* (2020.01)
*H05B 45/20* (2020.01)

(52) U.S. Cl.
CPC ............. *H05B 47/17* (2020.01); *H05B 45/20* (2020.01)

(58) Field of Classification Search
CPC ................................ H05B 47/17; H05B 45/20
See application file for complete search history.

(56) References Cited

U.S. PATENT DOCUMENTS

2015/0022123 A1 1/2015 Van De Sluis et al.
2016/0262239 A1 9/2016 Hole
(Continued)

FOREIGN PATENT DOCUMENTS

EP 2614687 A1 7/2013
EP 2614687 B1 * 3/2014 ......... H05B 33/0863
(Continued)

OTHER PUBLICATIONS

Lifx App, https://www.lifx.com/pages/app, last visited Feb. 22, 2023 (11 pages).

*Primary Examiner* — Daniel D Chang

(57) ABSTRACT

A system is configured to display a visual representation (41) of a color space and repositionable virtual representations (51-55) of individually addressable light segments overlaid on the visual representation of the color space. The light segments have a fixed spatial relationship in an array and the virtual representations have initial positions (71). The system is further configured to receive user input indicative of a change of one or more of the initial positions of the virtual representations and determine further positions (72) for the virtual representations based on the initial positions and the indicated change of the one or more of the initial positions. The initial and further positions are in order of the fixed spatial relationship. The system is further configured to determine light settings for the light segments based on the further positions and control the array of individually addressable light segments to render the light settings.

15 Claims, 6 Drawing Sheets

(56) References Cited

U.S. PATENT DOCUMENTS

| | | | |
|---|---|---|---|
| 2018/0124895 | A1 | 5/2018 | Alexander et al. |
| 2018/0279440 | A1 | 9/2018 | Van De Sluis et al. |

FOREIGN PATENT DOCUMENTS

| | | | | |
|---|---|---|---|---|
| WO | 2008001289 | A2 | 1/2008 | |
| WO | 2017080879 | A1 | 5/2017 | |
| WO | 2018122009 | A1 | 7/2018 | |
| WO | WO-2018122010 | A1 * | 7/2018 | ............ F21V 23/045 |
| WO | WO-2019214941 | A1 * | 11/2019 | ......... G06F 3/04845 |

* cited by examiner

300

CONTROLLING AN ARRAY OF LIGHT SEGMENTS BASED ON USER INTERACTION WITH VIRTUAL REPRESENTATIONS IN COLOR SPACE

CROSS-REFERENCE TO PRIOR APPLICATIONS

This application is the U.S. National Phase application under 35 U.S.C. § 371 of International Application No. PCT/EP2021/073072, filed on Aug. 19, 2021, which claims the benefit of European Patent Application No. 20192830.6, filed on Aug. 26, 2020. These applications are hereby incorporated by reference herein.

FIELD OF THE INVENTION

The invention relates to a system for controlling an array of individually addressable light segments based on user-specified light settings, said light segments having a fixed spatial relationship in said array.

The invention further relates to a method of controlling an array of individually addressable light segments based on user-specified light settings, said light segments having a fixed spatial relationship in said array.

The invention also relates to a computer program product enabling a computer system to perform such a method.

BACKGROUND OF THE INVENTION

The Philips Hue lighting system allows users to pick colors for individual luminaires, either individually, or as part of light-scenes. However, with the onset of pixelated lighting devices, such as e.g. led-strips, bulbs, and panels, it becomes an increasingly daunting task to set the color of each individual light source separately. Lifx, which makes pixelated tiles, not only allows users to manually pick colors, but also allows users to select presets (themes) and provides a paint mode. In this paint mode, users can select a color and make a drag gesture over the tiles, to indicate which parts of the tiles should render the selected color.

WO 17/080879 A1 discloses an alternative method of selecting colors for a light strip. This method comprises displaying an image on a display, receiving an input indicating an area of the image, analyzing the image area to derive a sequence of colors, generating a control signal based on the derived sequence of colors, and transmitting the control signal to the light strip to control the pixels to emit light in accordance with the derived sequence of colors.

The above-described paint mode makes it less work to manually pick colors, but user effort is only reduced if the user is willing to use the same color for multiple tiles. With the method disclosed in WO 17/080879 A1, it becomes relatively easy to select different colors for different pixels of a light strip, but the user is restricted in which colors and color gradients he can choose.

SUMMARY OF THE INVENTION

It is a first object of the invention to provide a system, which can be used to select colors for light segments of an array with limited user effort without greatly restricting users in their choices.

It is a second object of the invention to provide a method, which can be used to select colors for light segments of an array with limited user effort without greatly restricting users in their choices.

In a first aspect of the invention, a system for controlling an array of individually addressable light segments based on user-specified light settings, said light segments having a fixed spatial relationship in said array, comprises at least one input interface, at least one output interface, and a processor configured to display, via said at least one output interface, a visual representation of a color space and repositionable virtual representations of said light segments overlaid on said visual representation of said color space, said virtual representations having initial positions, said initial positions being in order of said fixed spatial relationship, receive, via said at least one input interface, user input indicative of a change an initial position of a virtual representation of said virtual representations, determine further positions for further virtual representations of said virtual representations based on said initial positions and said indicated change of said initial position, said further positions being in order of said fixed spatial relationship, determine said user-specified light settings for said light segments based on said change of said initial position of said virtual representation and said further positions of said further virtual representations in said color space, and control, via said at least one output interface, said array of individually addressable light segments to render said user-specified light settings.

This system makes it possible to create nice color gradients for user preferred colors in a smart and user-friendly way and control pixelated lighting systems to render these color gradients. The initial positions may be determined based on the current light settings or based on a smart interpolation (e.g. linear, curvilinear, equal brightness, or equal saturation) between user-controlled color points. Users can then indicate changes to these initial positions to customize the color gradients in a user-friendly, intuitive manner that preserves the option of controlling the individual segments.

The array of individually addressable light segments may be a single device, i.e. a pixelated lighting device, or may comprise multiple devices. The light segments have a fixed spatial relationship in the array, e.g. are pixels of a pixelated lighting devices or modules (e.g. tiles) of modular (e.g. tiled) lighting system. The light settings determined from the further positions may be stored in a light scene.

Said at least one processor may be configured to allow said user to reposition individual ones of said virtual representations. This makes it easy for users to fine-tune the light settings of the individual light segments.

Said virtual representations may be represented as a line and said at least one processor may be configured to allow said user to adjust a shape of said line by manipulating said line, said manipulation resulting in a repositioning of at least one of said virtual representations. The line may be a straight line, a curved line, or a line with one or more angles, for example. This makes it easy for users to simultaneously change the settings of multiple light segments.

Said at least one processor may be configured to allow said user to specify a first light setting for a first edge light segment of said array of light segments and/or a second light setting for a second edge light segment of said array of light segments and determine said initial positions based on said first light setting and/or said second light setting. The first edge light segment may be the leftmost, rightmost, top, or bottom segment of the array, for example. The above-mentioned line typically starts at a position corresponding to the first light setting and ends at a position corresponding to the second light setting. Said first light setting and said second light setting may differ in hue, saturation and/or brightness, for example. Typically, the user selects a light setting/color point for each of at least two of the light segments and preferably, at least one of these light segments is an edge light segment. Alternatively, the user may be allowed specify only light settings for intermediate light segments or the current light settings of the light segments may be obtained, for example.

Said at least one processor may be configured to allow said user to specify a user preference for a desired color gradient and determine said initial positions further based on said user preference for said desired color gradient. This makes it possible to automatically create a transition profile between start- and endpoint, of e.g. a pixelated lighting device, to achieve a desired color gradient while taking the number and order/location of segments, e.g. pixels, into account.

Said at least one processor may be configured to determine a line between said first light setting and said second light setting in said color space and determine said initial positions on said line. The line may be straight or curved, for example. Alternatively, a different type of interpolation may be used, e.g. curvilinear, equal brightness, or equal saturation.

Said at least one processor may be configured to allow said user to specify one or more further light settings for one or more further light segments of said array of light segments and determine said initial positions based on said one or more further light settings, said one or more further light segments being positioned between said first edge light segment and said second edge light segment in said fixed spatial relationship. This may be used to make it possible for the user to influence the above-mentioned interpolation (by adding additional color points).

Said at least one processor may be configured to allow said user to specify a spatial location for said first edge light segment relative to said fixed spatial relationship and determine said initial positions further based on said specified spatial location. For example, a user may be allowed to specify whether the first edge light segment is a leftmost, rightmost, top, or bottom segment. This allows the user to create a gradient that can be rendered in the manner intended by the user independent of how the array has been mounted/placed.

Said at least one processor may be configured to determine one or more properties of said array of light segments and determine said initial positions further based on said one or more properties of said array of light segments. Examples of properties are length of the array, number of segments in the array, degree of light diffusion, orientation of the array, and possible application of the array (such as behind a tv or cove lighting).

Said at least one processor may be configured to determine current light settings of said light segments and determine said initial positions based on said current light settings. This is beneficial if the user has previously set the colors of the segments manually and now wants to adjust the color gradient.

Said at least one processor may be configured to determine initial light settings for said light segments based on said initial positions of said virtual representations and control, via said at least one output interface, said array of individually addressable light segments to render said initial light settings. This allows the user to not only see the light settings represented in the user interface (overlaid on the visual representation of the color space), but also rendered on the light segments themselves. This makes the relation between what the user specifies in the user interface and what light settings will be rendered clearer.

Said at least one processor may be configured to display said visual representation of said color space and said virtual representations of said light segments on a touchscreen display and receive said user input via said touchscreen display. A touchscreen display makes it easy to provide user input, especially on a mobile device. Alternatively, a mouse be used, e.g. with a PC or augmented reality glasses where points can be moved over the color space through eye gaze.

In a second aspect of the invention, a method of controlling an array of individually addressable light segments based on user-specified light settings, said light segments having a fixed spatial relationship in said array, comprises displaying a visual representation of a color space and repositionable virtual representations of said light segments overlaid on said visual representation of said color space, said virtual representations having initial positions, said initial positions being in order of said fixed spatial relationship, receiving user input indicative of a change of an initial position of a virtual representation of said virtual representations, determining further positions for further virtual representations of said virtual representations based on said initial positions and said indicated change of said initial position, said further positions being in order of said fixed spatial relationship, determining said user-specified light settings for said light segments based on said change of said initial position of said virtual representation and said further positions of said further virtual representations in said color space, and controlling said array of individually addressable light segments to render said user-specified light settings. Said method may be performed by software running on a programmable device. This software may be provided as a computer program product.

Moreover, a computer program for carrying out the methods described herein, as well as a non-transitory computer readable storage-medium storing the computer program are provided. A computer program may, for example, be downloaded by or uploaded to an existing device or be stored upon manufacturing of these systems.

A non-transitory computer-readable storage medium stores at least one software code portion, the software code portion, when executed or processed by a computer, being configured to perform executable operations for controlling an array of individually addressable light segments based on user-specified light settings, said light segments having a fixed spatial relationship in said array.

The executable operations comprise displaying a visual representation of a color space and repositionable virtual representations of said light segments overlaid on said visual representation of said color space, said virtual representations having initial positions, said initial positions being in order of said fixed spatial relationship, receiving user input indicative of a change of one or more of said initial positions of said virtual representations, determining further positions for said virtual representations based on said initial positions and said indicated change of said one or more of said initial positions, said further positions being in order of said fixed spatial relationship, determining said user-specified light settings for said light segments based on said further positions of said virtual representations, and controlling said array of individually addressable light segments to render said user-specified light settings.

As will be appreciated by one skilled in the art, aspects of the present invention may be embodied as a device, a method or a computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit", "module" or "system." Functions described in this disclosure may be implemented as an algorithm executed by a processor/microprocessor of a computer. Furthermore, aspects of the present invention may take the form of a computer program product embodied in one or more computer readable medium(s) having computer readable program code embodied, e.g., stored, thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples of a computer readable storage medium may include, but are not limited to, the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of the present invention, a computer readable storage medium may be any tangible medium that can contain, or store, a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber, cable, RF, etc., or any suitable combination of the foregoing. Computer program code for carrying out operations for aspects of the present invention may be written in any combination of one or more programming languages, including an object oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems), and computer program products according to embodiments of the present invention. It will be understood that each block of the flowchart illustrations and/or block diagrams, and combinations of blocks in the flowchart illustrations and/or block diagrams, can be implemented by computer program instructions. These computer program instructions may be provided to a processor, in particular a microprocessor or a central processing unit (CPU), of a general purpose computer, special purpose computer, or other programmable data processing apparatus to produce a machine, such that the instructions, which execute via the processor of the computer, other programmable data processing apparatus, or other devices create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of devices, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

BRIEF DESCRIPTION OF THE DRAWINGS

These and other aspects of the invention are apparent from and will be further elucidated, by way of example, with reference to the drawings, in which.

Corresponding elements in the drawings are denoted by the same reference numeral.

DETAILED DESCRIPTION OF THE EMBODIMENTS

Figure 1:
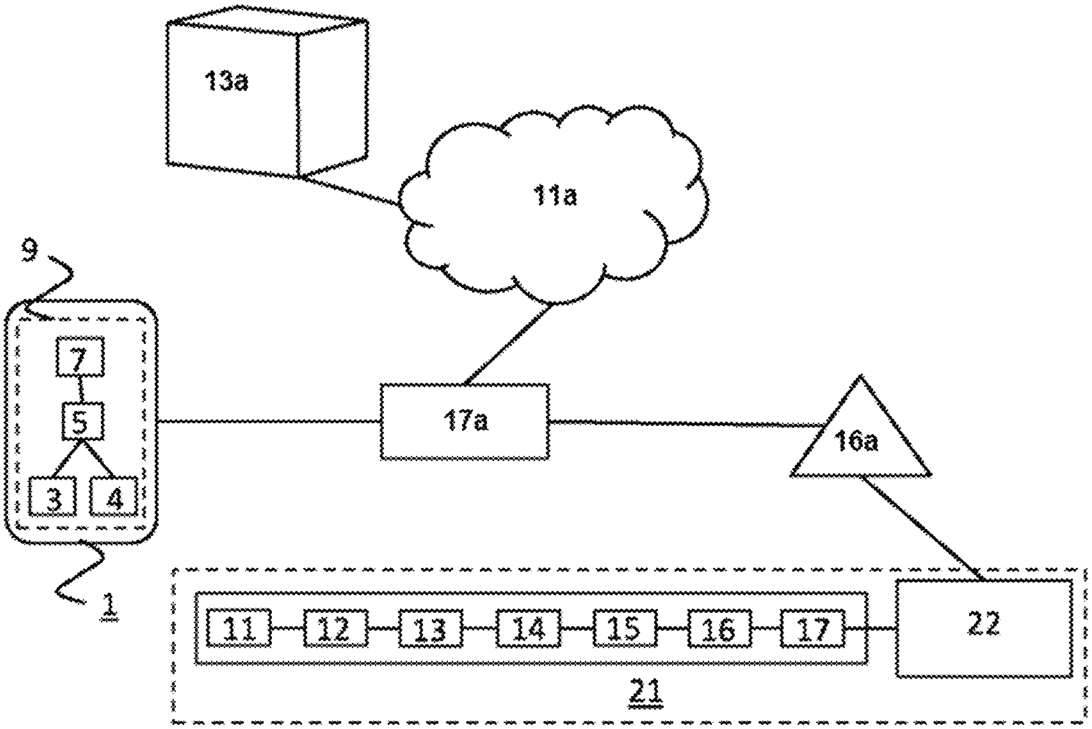
FIG. 1 is a block diagram of an embodiment of the system.

FIG. 1 shows an embodiment of the system for controlling an array of individually addressable light segments based on user-specified light settings. In the embodiment of FIG. 1, the system is a mobile device 1. In the example of FIG. 1, the array of individually addressable light segment is a (pixelated) light strip 21. The light strip 21 comprises a controller 22 and seven light segments 11-17.

The light segments 11-17 have a fixed spatial relationship in the light strip 21, i.e. light segment 11 is located adjacent to light segment 12, light segment 12 is located adjacent to light segments 11 and 13, etc. Each of the light segments 11-17 may comprise one or more light elements, e.g. direct emitting or phosphor converted LEDs. Seven segments per pixelated light strip will in practice be a relatively low quantity of segments per light strip, but this quantity has been chosen for the purpose of illustration.

The mobile device 1 may be a mobile phone, a tablet, smart glasses, or a smart watch, for example. A bridge 16 is connected to a wireless LAN access point 17, e.g. via Ethernet or Wi-Fi. The mobile device 1 is also connected to the wireless LAN access point 17*a*, e.g. via Wi-Fi. A user may be able to use an app running on mobile device 1 to control light strip 21 via the wireless LAN access point 17*a* and the bridge 16*a*. In the example of FIG. 1, the light strip 21 is controlled via the bridge 16*a*. Alternatively, the light strip 21 may be controlled without a bridge, e.g. directly via Bluetooth or indirectly via Internet 11*a*, Internet server 13*a* and the wireless LAN access point 17*a*.

The mobile device 1 comprises a transceiver 3, a transmitter 4, a processor 5, memory 7, and a touchscreen display 9. The processor 5 is configured to display, via the touchscreen display 9, a visual representation of a (e.g. HSL or HSV) color space and repositionable virtual representations of the light segments 11-17 overlaid on the visual representation 41 of the color space. The virtual representations have initial positions which are in order of the fixed spatial relationship. The initial positions may be determined based on the current light settings of the light segments or may be determined based on user input, e.g. received via the touchscreen display 9. It may be possible to obtain current light settings of the light strip 21 from the light strip 21 or from the bridge 16*a*, for example.

The processor 5 is further configured to receive, via the touch screen display 9, user input indicative of a change of an initial positions of a virtual representation of the virtual representations and determine further positions for further virtual representations (virtual representations other that the virtual representation of which the initial position has been changed) of the virtual representations, based on the initial positions and the indicated change of the initial position of the virtual representation. The further positions are in order of the fixed spatial relationship. The processor 5 is further configured to determine the user-specified light settings for the light segments 11-17 based on the change of the initial position of the virtual representation and the further positions of the virtual representations in the color space, and control, via the transmitter 4, the light strip 21 to render the user-specified light settings. Thus, with this user interface, the user is able to specify the light settings in a user-friendly, intuitive manner.

The mobile device 1 assists the user by implementing 'smart' trajectories (e.g. color paths) between individual pixels. The path chosen can be easily viewed and manipulated in the user interface. The task of implementing smooth transitions is then left to the (software running on the) processor 5, allowing the user to focus on the aesthetic aspect only.

Figure 2:
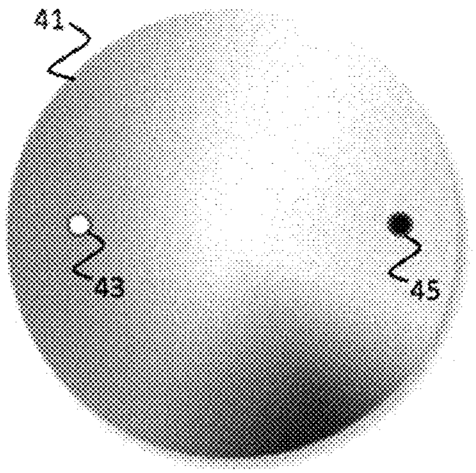
FIG. 2 shows an example of virtual representations of edge light segments being overlaid on a visual representation of a color space.

FIG. 2 shows an example of virtual representations of edge light segments being overlaid on a visual representation of a color space. In FIG. 2, an example is provided of a visual representation 41 of given color space, where the user can control two points. In the example of FIG. 2, these two points are the endpoints. The user is able to change the positions of the virtual representations 43 and 45 of the edge light segments (11 and 17 in FIG. 1) in order to change the chromaticity parameter for these two light segments. Next, the system generates a transition profile. This is shown in FIG. 3.

Figure 3:
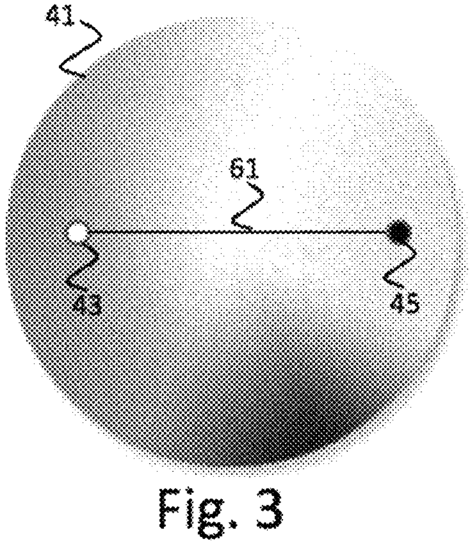
FIG. 3 shows a first example of virtual representations of edge and intermediate light segments being overlaid on the color space representation of FIG. 2.

In the example of FIG. 3, the transition profile is represented by a line 61 and this line 61 reflects the shortest distance between the two points in the selected color space. Some of the points on the line represent the intermediate light segments. In the examples of FIGS. 2 and 3, only the chromaticity (hue, saturation) of the color space is represented, and the virtual representations 43, 45 and 61 only reflect chromaticity parameters. However, additional parameters (e.g. lightness) could be controlled similarly. In the example of FIG. 3, the transition profile is a straight line, but the transition profile could also be curved. The transition profile may be adjusted to prevent it from going through white or to keep saturation constant, e.g. through a curved trajectory. Such an adjustment is beneficial in many cases.

Figure 4:
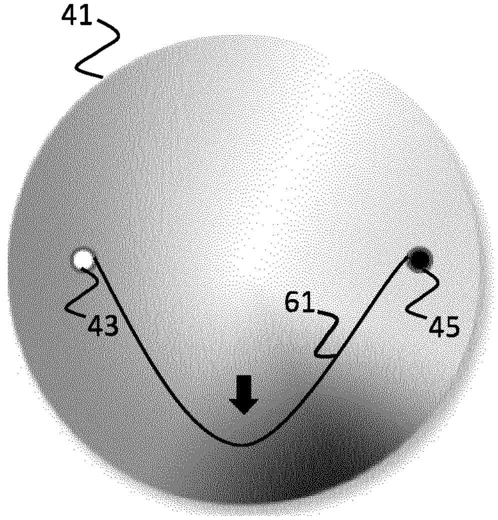
FIG. 4 shows an example in which the virtual representations of the intermediate light segments of FIG. 3 are repositioned.

In the example of FIG. 4, the user is able to adjust a shape of the line 61 by manipulating the line 61. This manipulation results in a repositioning of the virtual representations of the intermediate light segments.

Figure 5:
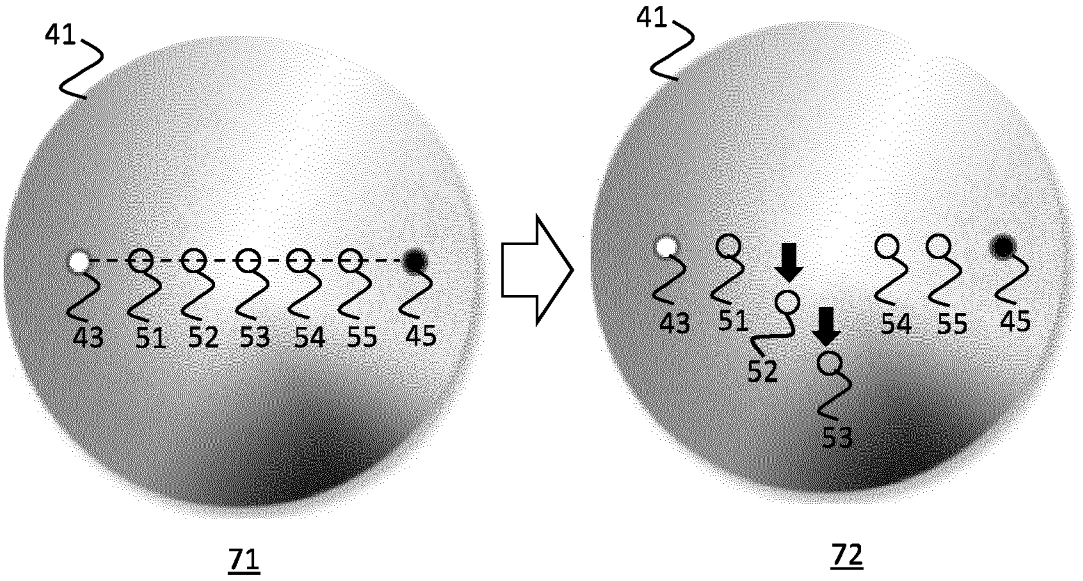
FIG. 5 shows a second example in which virtual representations of intermediate light segments are repositioned.

In the example of FIG. 5, individual virtual representations 51-55 of the intermediate light segments are overlaid on the visual representation 41 of the color space. These virtual representations 51-55 have initial positions 71 on a straight line between the virtual representations 43 and 45 of the edge light segments. The user can reposition these virtual representations 51-55 to obtain further positions 72.

In the example of FIG. 5, the user has moved virtual positions 52 and 53 downward, thereby manipulating the individual 'pixels' in the transition profile. The user is not able to move the virtual positions 51-55 anywhere he wants, as the further positions need to be in order of the fixed spatial relationship that the light segments have in the array. For example, the user may not be allowed to position virtual representation 52 such that it is closer to virtual representation 43 than virtual representation 51 is to virtual representation 43.

In the embodiment of the mobile device 1 shown in FIG. 1, the mobile device 1 comprises one processor 5. In an alternative embodiment, the mobile device 1 comprises multiple processors. The processor 5 of the mobile device 1 may be a general-purpose processor, e.g. from ARM or Qualcomm or an application-specific processor. The processor 5 of the mobile device 1 may run an Android or iOS operating system for example. The display 9 may comprise an LCD or OLED display panel, for example. The memory 7 may comprise one or more memory units. The memory 7 may comprise solid state memory, for example.

The receiver 3 and the transmitter 4 may use one or more wireless communication technologies, e.g. Wi-Fi (IEEE 802.11) for communicating with the wireless LAN access point 17*a*, for example. In an alternative embodiment, multiple receivers and/or multiple transmitters are used instead of a single receiver and a single transmitter. In the embodiment shown in FIG. 1, a separate receiver and a separate transmitter are used. In an alternative embodiment, the receiver 3 and the transmitter 4 are combined into a transceiver. The mobile device 1 may comprise other components typical for a mobile device such as a battery and a power connector. The invention may be implemented using a computer program running on one or more processors.

In the embodiment of FIG. 1, the system of the invention is a mobile device. In an alternative embodiment, the system of the invention is a different device, e.g. an Internet server which is able to display information and receive input via a user device, e.g. a mobile device or a PC. In the embodiment of FIG. 1, the system of the invention comprises a single device. In an alternative embodiment, the system of the invention comprises a plurality of devices.

Figure 6:
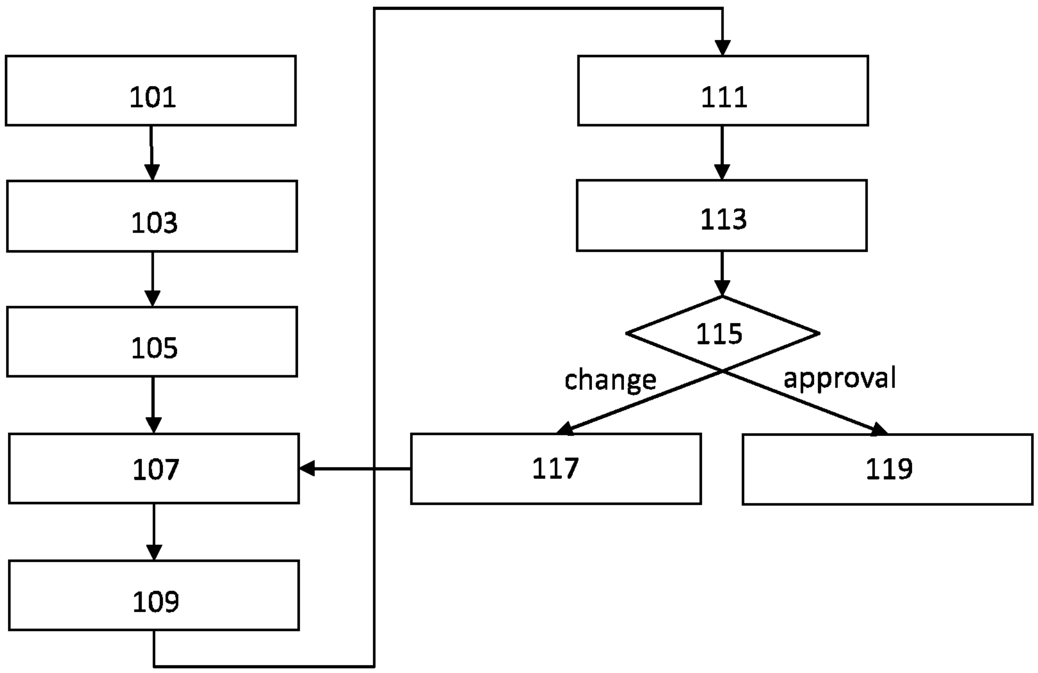
FIG. 6 is a flow diagram of a first embodiment of the method.

A first embodiment of the method of controlling an array of individually addressable light segments based on user-specified light settings is shown in FIG. 6. The light segments have a fixed spatial relationship in the array. A step 101 comprises allowing the user to specify a first light setting for a first edge light segment of the array of light segments and a second light setting for a second edge light segment of the array of light segments. The first light setting and the second light setting may differ in hue, saturation and/or brightness, for example.

The user may be able to use a color picker to separately specify the first and second light settings. Alternatively, the user may be able to use a smartphone app to indicate start- and endpoints on a visual representation of a color space, for example. The first selected color point may be mapped to the first segment of the array, while the second selected color point may be mapped to the last segment of the array. Besides using the timing of color point selection for the mapping, other principles for mapping colors to edge segments may be used. For example, a color point selected on the left side may be mapped to the first segment of the array and a color point selected on the right side may be mapped to the last segment of the array. Similarly, a color point selected on the upper half may be mapped to the first segment of the array and a color point selected on the bottom half may be mapped to the last segment of the array.

A step 103 comprises allowing the user to specify a user preference for a desired color gradient. A step 105 comprises determining the initial positions based on the first light setting and the second light setting and further based on the user preference for the desired color gradient. The initial positions are in order of the fixed spatial relationship.

Step 105 may comprise calculating a transition profile. Different transition profiles may be used, for example linear transitions or curved transitions. The profile may comprise only hue transitions or also intensity (brightness/lightness) transitions, saturation transitions, or a combination of both. The transition profile depends on the gradient specified by the user in step 103. In step 103, the user may be able to specify whether he wants to use a linear or curvilinear chromaticity gradient and/or a gradient with equal brightness and/or a gradient with equal saturation, for example. A default transition profile might be determined by the system, for example based on lighting design knowledge, user profile information, or historic use of transition profile.

In an alternative embodiment, the user may be allowed to specify a spatial location for the first edge light segment relative to the fixed spatial relationship and the initial positions may further be determined based on the specified spatial location. For example, a user may specify that first edge light segment is the leftmost, rightmost, top or bottom pixel of a light strip.

Alternatively, a spatial location of the first edge light segment may be assumed. For example, for horizontal light strips, the first color point that the user selects in the UI may be mapped to the leftmost pixel of the light strip and the second color point to the rightmost pixel of the light strip. For vertical light strips, the first selected color point may be mapped to the top pixel of the light strip, while the second light point may be mapped to the bottom pixel of the light strips. This mapping maybe different for different users, e.g. based on what is custom in certain geolocations (Arabic, Hebrew, Japanese, Hebrew).

In the same or in a different alternative embodiment, one or more properties of the array of light segments may be determined and the initial positions may further be determined based on the one or more properties of the array of light segments. For example, for a pixelated LED strip, the information regarding the strip (e.g. length, number of pixels, orientation, degree of light diffusion, possibly application, such as behind a tv, cove lighting etc.) may be used to further fine-tune the transition profile.

Next, a step 107 comprises determining light settings for the light segments. In the first iteration of step 107, the light settings are determined based on the initial positions determined in step 105. A step 109 comprises controlling the array of light segments to render the light settings determined in step 107.

A step 111 comprises displaying a user interface (UI) comprising a visual representation of a color space and repositionable virtual representations of the light segments overlaid on the visual representation of the color space. The virtual representations have the initial positions determined in step 105. The user interface may allow the user to reposition individual ones of the virtual representations, or if the virtual representations are represented as a line, may allow the user to adjust a shape of the line by manipulating the line. This manipulation results in a repositioning of at least one of the virtual representations.

Thus, this user interface may be used to fine-tune the colors rendered on the light segments of the array. The transition profile can be visualized in the UI, for example with the selected points visualized in a color space and lines in-between following the path of the transition profile. This enables users to manipulate the transitional profile, e.g. by dragging the line as shown in FIG. 4, or by adding additional points/curves. As the system has knowledge about the controllable light segments (e.g. number of pixels, order/location of pixels), the UI could also represent the controllable segments pixels in the UI with individual virtual representations, as shown in FIG. 5. The UI may have a button/ element to easily swap start and end points, such that the gradients flows in the other direction.

A step 113 comprises receiving user input in response to the displayed user interface. Next, a step 115 comprises checking whether the user input is indicative of an approval of the positions of the virtual representations of the light segments as shown in the user interface, and thus of their light settings, or indicative of a change of one or more of the initial positions of the virtual representations. In the former case, a step 119 is performed. In the latter case, a step 117 is performed.

Step 117 comprises determining new positions for the virtual representations based on the positions determined in step 107 and the change of the one or more of the initial positions, as indicated in the user input received in step 113. The new positions are in order of the fixed spatial relationship. After step 117 has been performed, step 107 is repeated and in this iteration of step 107, light settings are determined for the light segments based on the new positions determined in step 117. The method then proceeds as shown in FIG. 6.

Step 119 comprises controlling the array of individually addressable light segments to render the last light settings determined in step 107, i.e. the light settings determined based on the further positions. The light settings determined in step 107 are either based on the initial positions determined in step 105, if the first user input received in step 113 indicated an approval, or based on the new positions determined in step 117, if the first user input received in step 113 indicated a change of one or more of the initial positions.

Figure 7:
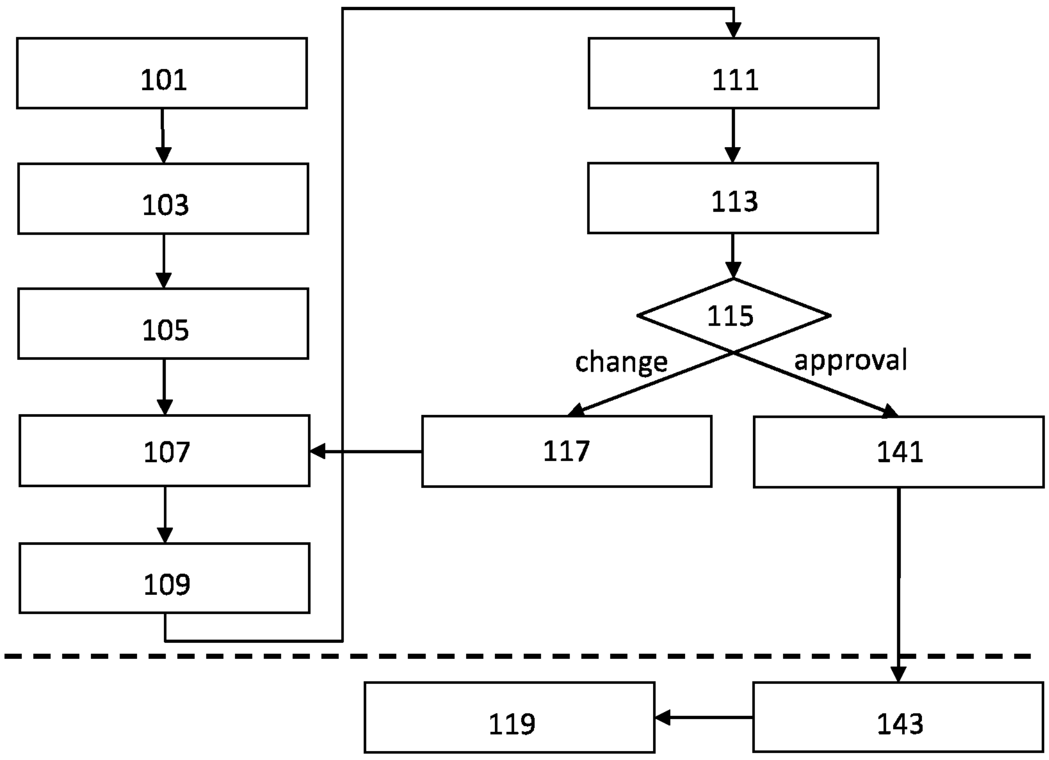
FIG. 7 is a flow diagram of a second embodiment of the method.

A second embodiment of the method of controlling an array of individually addressable light segments based on user-specified light settings is shown in FIG. 7. In the embodiment of FIG. 7, compared to the embodiment of FIG. 6, step 119 is not performed directly after the user has approved the positions of the virtual representations of the light segments shown in the user interface, and thus their light settings. Instead, the last light settings determined in step 107 are stored in a light scene in a step 141. At a later time, the light scene is recalled in a step 143, which results in the array of individually addressable light segments being controlled to render the stored light settings, i.e. the last light settings determined in step 107, in step 119.

Figure 8:
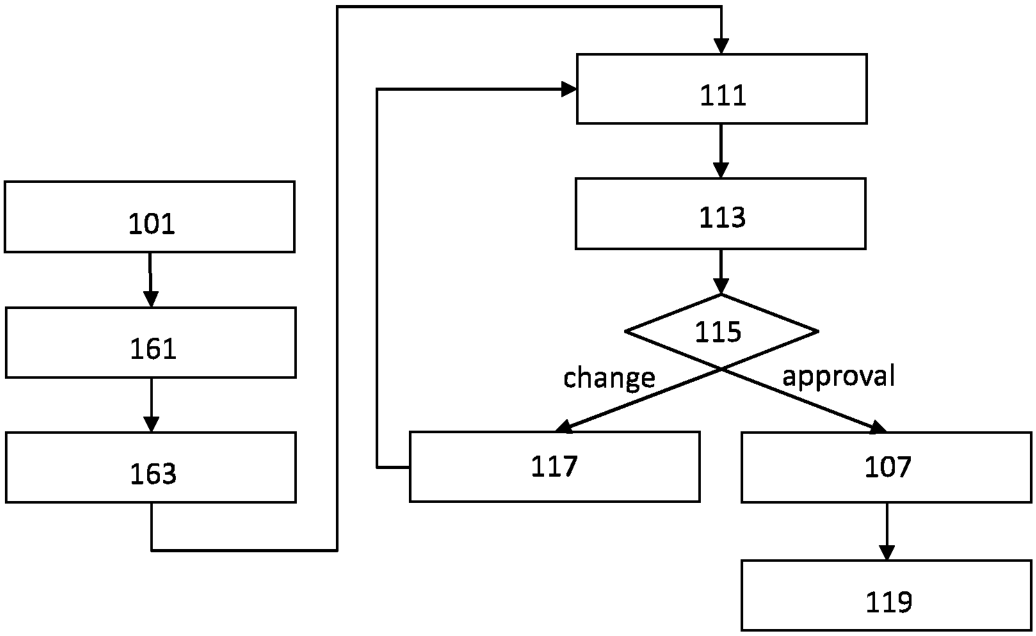
FIG. 8 is a flow diagram of a third embodiment of the method.

A third embodiment of the method of controlling an array of individually addressable light segments based on user-specified light settings is shown in FIG. 8. The light segments have a fixed spatial relationship in the array. Step 101 comprises allowing the user to specify a first light setting for a first edge light segment of the array of light segments and a second light setting for a second edge light segment of the array of light segments.

A step 161 comprises determining a (e.g. straight) line between the first light setting and the second light setting in the color space. A step 163 comprises determining the initial positions on the straight line. The initial positions are in order of the fixed spatial relationship.

Next, step 111 comprises displaying a user interface comprising a visual representation of a color space and repositionable virtual representations of the light segments overlaid on the visual representation of the color space. The virtual representations have the initial positions determined in step 163.

Step 113 comprises receiving user input in response to the displayed user interface. Next, step 115 comprises checking whether the user input is indicative of an approval of the positions of the virtual representations of the light segments as shown in the user interface, and thus of their light settings, or indicative of a change of one or more of the initial positions of the virtual representations. In the former case, step 107 is performed. In the latter case, a step 117 is performed.

Step 117 comprises determining new positions for the virtual representations based on the positions determined in step 107 and the change of the one or more of the initial positions, as indicated in the user input received in step 113. The new positions are in order of the fixed spatial relationship. After step 117 has been performed, step 111 is repeated and the method then proceeds as shown in FIG. 8.

Step 107 comprises determining light settings for the light segments. The light settings determined in step 107 are either based on the initial positions determined in step 163, if the first user input received in step 113 indicated an approval, or based on the new positions determined in step 117, if the first user input received in step 113 indicated a change of one or more of the initial positions. Step 119 comprises controlling the array of individually addressable light segments to render the light setting determined in step 107.

Figure 9:
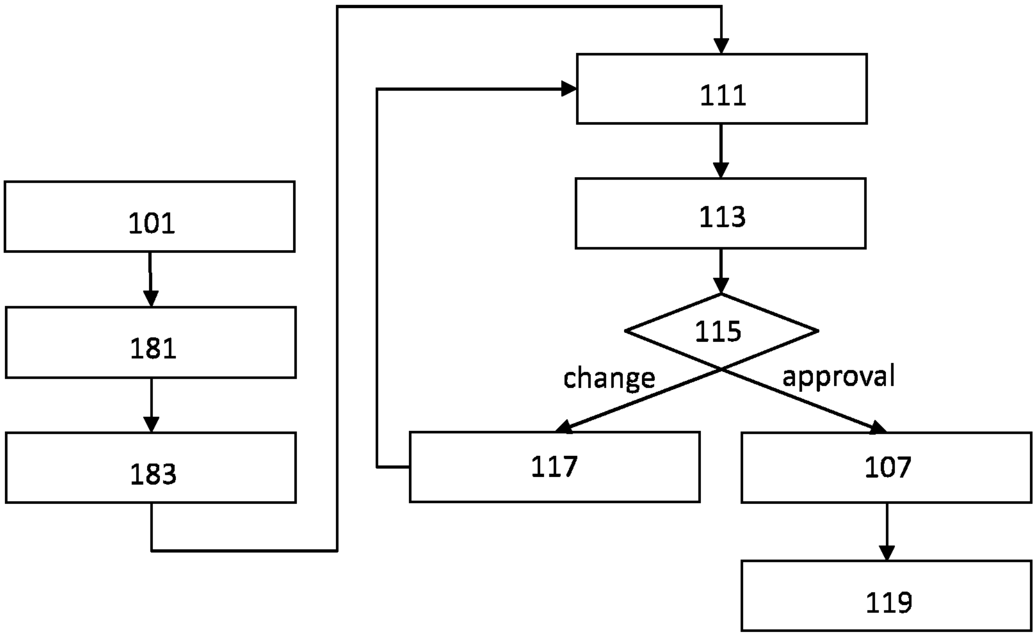
FIG. 9 is a flow diagram of a fourth embodiment of the method.

A fourth embodiment of the method of controlling an array of individually addressable light segments based on user-specified light settings is shown in FIG. 9. The light segments have a fixed spatial relationship in the array. In the embodiment of FIG. 9, compared to the embodiment of FIG. 8, steps 161 and 163 have been replaced with steps 181 and 183. Step 101 comprises allowing the user to specify a first light setting for a first edge light segment of the array of light segments and/or a second light setting for a second edge light segment of the array of light segments.

Step 181 comprises allowing the user to specify one or more further light settings for one or more further light segments of the array of light segments. The one or more further light segments are positioned between the first edge light segment and the second edge light segment in the fixed spatial relationship. Step 183 comprises determining the initial positions based on the first light setting and/or the second light setting and further based on the one or more further light settings. The light settings determined in step 107 are based on the initial positions determined in step 183 if the first user input received in step 113 indicated an approval.

In the UI described in relation to FIG. 5, intermediate points may be added by tapping in the color space, for example. In this case, a transition profile may be calculated for the first to the second point and for the second point to the third point, etc.

Figure 10:
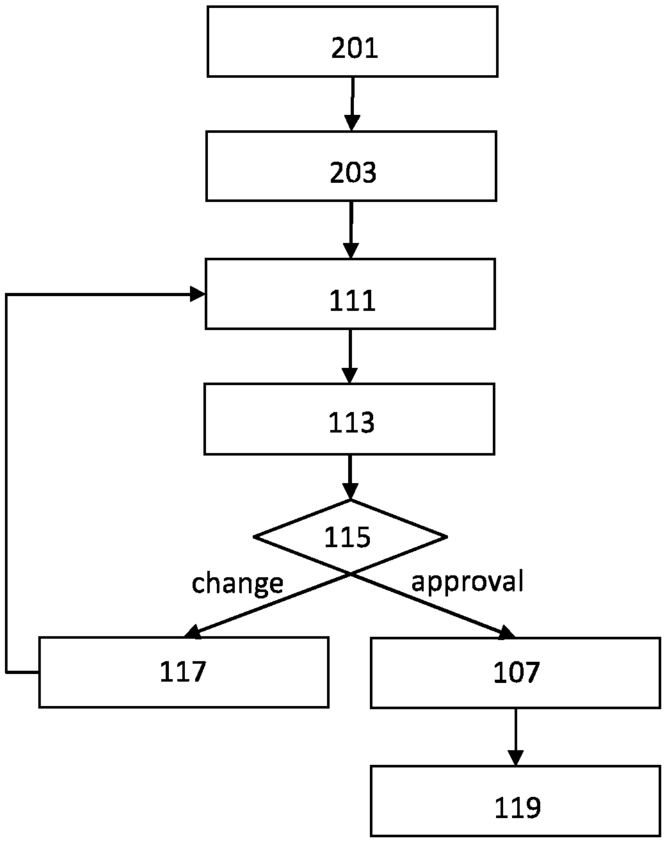
FIG. 10 is a flow diagram of a fifth embodiment of the method.

A fifth embodiment of the method of controlling an array of individually addressable light segments based on user-specified light settings is shown in FIG. 10. The light segments have a fixed spatial relationship in the array. Step 201 comprises determining current light settings of the light segments. Step 203 comprises determining the initial positions based on the current light settings. After step 203, steps 111 to 119 are performed as described in relation to FIG. 8. However, the light settings determined in step 107 are based on the initial positions determined in step 203 if the first user input received in step 113 indicated an approval.

The embodiments of FIGS. 6 to 10 differ from each other in multiple aspects, i.e. multiple steps have been added or replaced. In variations on these embodiments, only a subset of these steps is added or replaced and/or one or more steps is omitted. As a first example, steps 141 and 143 may be added to the embodiments of FIGS. 8 to 10. As a second example, step 109 may be omitted from the embodiments of FIGS. 6 and 7 and/or added to the embodiments of FIGS. 8 to 10. In the latter example, step 107 may consequently be performed at a different moment.

Figure 11:
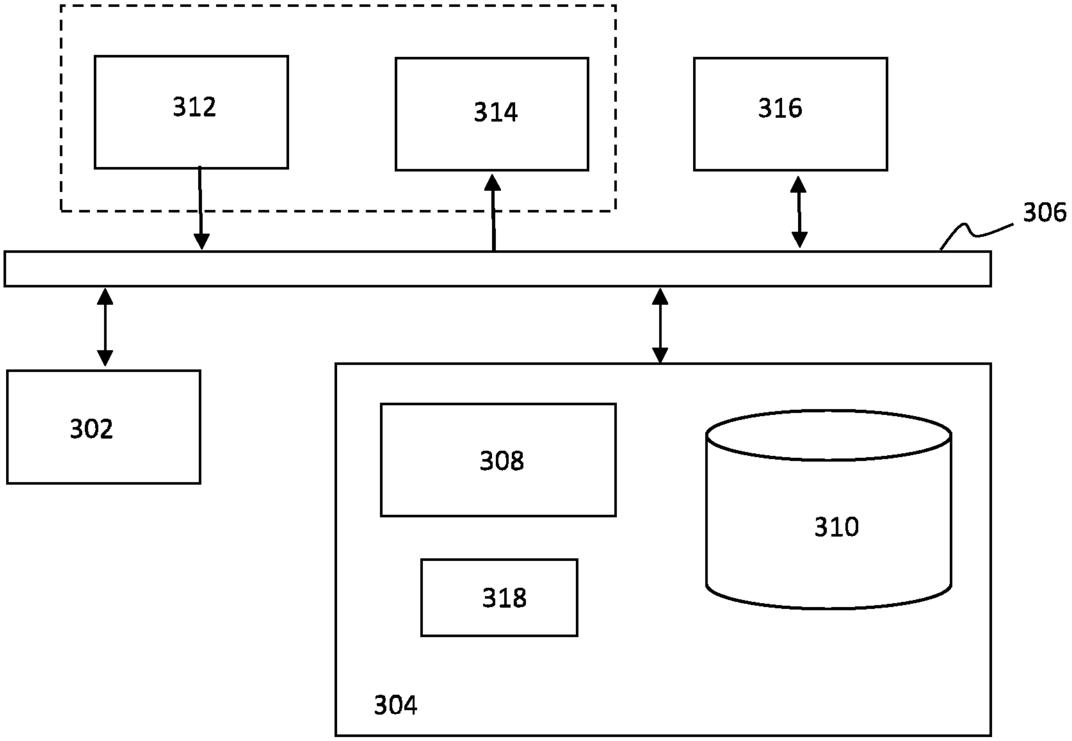
FIG. 11 is a block diagram of an exemplary data processing system for performing the method of the invention.

FIG. 11 depicts a block diagram illustrating an exemplary data processing system that may perform the method as described with reference to FIGS. 6 to 10.

As shown in FIG. 11, the data processing system 300 may include at least one processor 302 coupled to memory elements 304 through a system bus 306. As such, the data processing system may store program code within memory elements 304. Further, the processor 302 may execute the program code accessed from the memory elements 304 via a system bus 306. In one aspect, the data processing system may be implemented as a computer that is suitable for storing and/or executing program code. It should be appreciated, however, that the data processing system 300 may be implemented in the form of any system including a processor and a memory that is capable of performing the functions described within this specification. The data processing system may be an Internet/cloud server, for example.

The memory elements 304 may include one or more physical memory devices such as, for example, local memory 308 and one or more bulk storage devices 310. The local memory may refer to random access memory or other non-persistent memory device(s) generally used during actual execution of the program code. A bulk storage device may be implemented as a hard drive or other persistent data storage device. The processing system 300 may also include one or more cache memories (not shown) that provide temporary storage of at least some program code in order to reduce the quantity of times program code must be retrieved from the bulk storage device 310 during execution. The processing system 300 may also be able to use memory elements of another processing system, e.g. if the processing system 300 is part of a cloud-computing platform.

Input/output (I/O) devices depicted as an input device 312 and an output device 314 optionally can be coupled to the data processing system. Examples of input devices may include, but are not limited to, a keyboard, a pointing device such as a mouse, a microphone (e.g. for voice and/or speech recognition), or the like. Examples of output devices may include, but are not limited to, a monitor or a display, speakers, or the like. Input and/or output devices may be coupled to the data processing system either directly or through intervening I/O controllers.

In an embodiment, the input and the output devices may be implemented as a combined input/output device (illustrated in FIG. 11 with a dashed line surrounding the input device 312 and the output device 314). An example of such a combined device is a touch sensitive display, also sometimes referred to as a "touch screen display" or simply "touch screen". In such an embodiment, input to the device may be provided by a movement of a physical object, such as e.g. a stylus or a finger of a user, on or near the touch screen display.

A network adapter 316 may also be coupled to the data processing system to enable it to become coupled to other systems, computer systems, remote network devices, and/or remote storage devices through intervening private or public networks. The network adapter may comprise a data receiver for receiving data that is transmitted by said systems, devices and/or networks to the data processing system 300, and a data transmitter for transmitting data from the data processing system 300 to said systems, devices and/or networks. Modems, cable modems, and Ethernet cards are examples of different types of network adapter that may be used with the data processing system 300.

As pictured in FIG. 11, the memory elements 304 may store an application 318. In various embodiments, the application 318 may be stored in the local memory 308, the one or more bulk storage devices 310, or separate from the local memory and the bulk storage devices. It should be appreciated that the data processing system 300 may further execute an operating system (not shown in FIG. 11) that can facilitate execution of the application 318. The application 318, being implemented in the form of executable program code, can be executed by the data processing system 300, e.g., by the processor 302. Responsive to executing the application, the data processing system 300 may be configured to perform one or more operations or method steps described herein.

Various embodiments of the invention may be implemented as a program product for use with a computer system, where the program(s) of the program product define functions of the embodiments (including the methods described herein). In one embodiment, the program(s) can be contained on a variety of non-transitory computer-readable storage media, where, as used herein, the expression "non-transitory computer readable storage media" comprises all computer-readable media, with the sole exception being a transitory, propagating signal. In another embodiment, the program(s) can be contained on a variety of transitory computer-readable storage media. Illustrative computer-readable storage media include, but are not limited to: (i) non-writable storage media (e.g., read-only memory devices within a computer such as CD-ROM disks readable by a CD-ROM drive, ROM chips or any type of solid-state non-volatile semiconductor memory) on which information is permanently stored; and (ii) writable storage media (e.g., flash memory, floppy disks within a diskette drive or hard-disk drive or any type of solid-state random-access semiconductor memory) on which alterable information is stored. The computer program may be run on the processor 302 described herein.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of embodiments of the present invention has been presented for purposes of illustration, but is not intended to be exhaustive or limited to the implementations in the form disclosed. Many modifications and variations will be apparent to those of ordinary skill in the art without departing from the scope and spirit of the present invention. The embodiments were chosen and described in order to best explain the principles and some practical applications of the present invention, and to enable others of ordinary skill in the art to understand the present invention for various embodiments with various modifications as are suited to the particular use contemplated.

The invention claimed is:

1. A system for controlling an array of individually addressable light segments based on user-specified light settings, said light segments having a fixed spatial relationship in said array, said system comprising:
- at least one input interface;
- at least one output interface; and
- a processor configured to:
  - display, via said at least one output interface, a visual representation of a color space and repositionable virtual representations of said light segments overlaid on said visual representation of said color space, said virtual representations having initial positions, said initial positions being in order of said fixed spatial relationship,
  - receive, via said at least one input interface, user input indicative of a change of an initial position of a virtual representation of said virtual representations,
  - determine further positions for further virtual representations of said virtual representations, based on said initial positions and said indicated change of said initial position, said further positions being in order of said fixed spatial relationship,
  - determine said user-specified light settings for said light segments based on said change of said initial position of said virtual representation and said further positions of said further virtual representations in said color space, and
  - control, via said at least one output interface, said array of individually addressable light segments to render said user-specified light settings.

2. The system as claimed in claim 1, wherein said at least one processor is configured to allow said user to reposition individual ones of said virtual representations.

3. The system as claimed in claim 1, wherein said virtual representations are represented as a line and said at least one processor is configured to allow said user to adjust a shape of said line by manipulating said line, said manipulation resulting in a repositioning of at least one of said virtual representations.

4. The system as claimed in claim 1, wherein said at least one processor is configured to allow said user to specify a first light setting for a first edge light segment of said array of light segments and/or a second light setting for a second edge light segment of said array of light segments and determine said initial positions based on said first light setting and/or said second light setting.

5. The system as claimed in claim 4, wherein said at least one processor is configured to allow said user to specify a spatial location for said first edge light segment relative to said fixed spatial relationship and determine said initial positions further based on said specified spatial location.

6. The system as claimed in claim 4, wherein said at least one processor is configured to allow said user to specify a user preference for a desired color gradient and determine said initial positions further based on said user preference for said desired color gradient.

7. The system as claimed in claim 4, wherein said at least one processor is configured to determine one or more properties of said array of light segments and determine said initial positions further based on said one or more properties of said array of light segments.

8. The system as claimed in claim 4, wherein said at least one processor is configured to determine a line between said first light setting and said second light setting in said color space and determine said initial positions on said line.

9. The system as claimed in claim 4, wherein said at least one processor is configured to allow said user to specify one or more further light settings for one or more further light segments of said array of light segments and determine said initial positions further based on said one or more further light settings, said one or more further light segments being positioned between said first edge light segment and said second edge light segment in said fixed spatial relationship.

10. The system as claimed in claim 4, wherein said first light setting and said second light setting differ in hue, saturation and/or brightness.

11. The system as claimed in claim 1, wherein said at least one processor is configured to determine current light settings of said light segments and determine said initial positions based on said current light settings.

12. The system as claimed in claim 1, wherein said at least one processor is configured to:
- determine initial light settings for said light segments based on said initial positions of said virtual representations, and
- control, via said at least one output interface, said array of individually addressable light segments to render said initial light settings.

13. The system as claimed in claim 1, wherein said at least one processor is configured to display said visual representation of said color space and said virtual representations of said light segments on a touchscreen display and receive said user input via said touchscreen display.

14. A method of controlling an array of individually addressable light segments based on user-specified light settings, said light segments having a fixed spatial relationship in said array, said method comprising:
- displaying a visual representation of a color space and repositionable virtual representations of said light segments overlaid on said visual representation of said color space, said virtual representations having initial positions, said initial positions being in order of said fixed spatial relationship;
- receiving user input indicative of a change of an initial position of said virtual representations;
- determining further positions for further virtual representations of said virtual representations based on said initial positions and said indicated change of said initial position, said further positions being in order of said fixed spatial relationship;
- determining said user-specified light settings for said light segments based on said change of said initial position of said virtual representation and said further positions of said further virtual representations in said color space; and
- controlling said array of individually addressable light segments to render said user-specified light settings.

15. A non-transitory computer readable medium comprising computer program code to perform the method of claim 14 when the computer program product is run on one or more processors.

* * * * *